United States Patent
Baluja et al.

(10) Patent No.: US 9,026,479 B1
(45) Date of Patent: May 5, 2015

(54) PREDICTING USER INTERESTS

(75) Inventors: Shumeet Baluja, Leesburg, VA (US); Michele Covell, Palo Alto, CA (US)

(73) Assignee: Google Inc., Mountain View, CA (US)

( * ) Notice: Subject to any disclaimer, the term of this patent is extended or adjusted under 35 U.S.C. 154(b) by 630 days.

(21) Appl. No.: 13/019,782

(22) Filed: Feb. 2, 2011

(51) Int. Cl.
G06F 15/18 (2006.01)
G06F 17/30 (2006.01)

(52) U.S. Cl.
CPC ............................... *G06F 17/30522* (2013.01)

(58) Field of Classification Search
None
See application file for complete search history.

(56) References Cited

U.S. PATENT DOCUMENTS

| 7,383,258 | B2 | 6/2008 | Harik et al. | |
| 7,603,348 | B2 * | 10/2009 | He et al. | 1/1 |
| 8,583,566 | B2 * | 11/2013 | Aravamudan et al. | 706/12 |
| 2009/0268672 | A1 * | 10/2009 | Kline et al. | 370/328 |

OTHER PUBLICATIONS

Demir, Uyar, Gunduz-Oguducu, "Multiobjective evolutionary clustering of Web user sessions: a case study in Web page recommendation", Journal of Soft Computing—A Fusion of Foundations, Methodologies and Applications, vol. 14, issue 6, Jan. 2010, pp. 579-597.*
He, Jiang, Liao, Hoi, Chang, Lim, Li, "Web Query Recommendation via Sequential Query Prediction", Proceedings of the 2009 IEEE International Conference on Data Engineering, 2009, pp. 1443-1454.*
White, Bailey, Chen, "Predicting User Interest from Contextual Information", Proceedings of the 32nd international ACM SIGIR conference on Research and development in information retrieval, Jul. 2009, pp. 363-370.*
Widyantoro, Ioerger and Yen, "Learning User Interest Dynamics with a Three-Descriptor Rpresentation", Journal of the American Society for Information Science and Technology archive, vol. 52 Issue 3, Feb. 1, 2001, pp. 212-225.*
Baluja, Shomeet, "Population-Based Incremental Learning. A Method for Integrating Genetic Search Based Function Optimization and Competitive Learning." Technical Report (Pittsburgh, PA: Carnegie Mellon University) (CMU-CS-94-163), Jun. 2, 1994, 41 pages.
Kirkpatrick, S, et al. "Optimization by Simulated Annealing," Science, New Series, vol. 220, No. 4598, pp. 671-680, May 13, 1983.

(Continued)

*Primary Examiner* — Kakali Chaki
*Assistant Examiner* — Walter Hanchak
(74) *Attorney, Agent, or Firm* — Fish & Richardson P.C.

(57) ABSTRACT

Methods, systems, and apparatus, including computer programs encoded on a computer storage medium, for predicting user interests. In one aspect, a method includes training a prediction model to generate a category prediction of a next query from a set of queries, the category prediction specifying categories to which a next query belongs, the prediction model comprising a plurality of prediction functions that each generate a category prediction of a next query, wherein the prediction functions include two or more of a time-based prediction functions that generate a category prediction based on the category data and a difference of submission times of the queries, a rank-based prediction functions that generate a category prediction based on the category data and a rank order by which the queries were received, and a category-based prediction function that generates a category prediction based on the category data.

22 Claims, 3 Drawing Sheets

(56) References Cited

OTHER PUBLICATIONS

Rosete-Suarez et al. "Automatic Graph Drawing and Stochastic Hill Climbing," Proceedings of the Genetic and Evolutuinary Computation Conference, vol. 2 Orlando, Florida, USA: Morgan Kaufmann (Jan. 2000), p. 1699-1706.

Wikipedia, the free encyclopedia. "Tabu Search" [online] [printed Sep. 14, 2011] http://en.wikipedia.org/wiki/Tabu_search. 3 pages.

* cited by examiner

PREDICTING USER INTERESTS

BACKGROUND

This specification relates to predicting user interests.

The Internet provides access to a wide variety of resources, for example, video files, image files, audio files, or Web pages. Search systems are used to help users find resources that may satisfy their informational needs. A search system receives a search query and selects one or more resources in response to receiving the search query. A search query is data that a user submits to a search engine to find resources that satisfy the user's informational needs. The search queries are usually in the form of text, e.g., one or more query terms. The search system selects and scores resources based on their relevance to the search query and on their importance relative to other resources, and provides search results that link to the selected resources ordered according to the scores.

Providers of some search systems provide advertisements with the search results to monetize their services. A prevalent Internet advertising model targets advertisements based on query keywords. The advertisements are sent to the user device to be presented with search results responsive to the query. Some advertising models take into account user search histories on a per-user basis when providing advertisements. For example, some models take into account one of a query history of user queries, a query frequency of user queries, or a category history of user queries to predict a next query or query category for a user. However, each of these models is sensitive to the environment in which a user submits queries and how often a user uses the search service. For example, when a user submits queries in a maps-based interface, the previous queries submitted by the user may not be indicative of the user's current interests. Likewise, when a user submits queries to the search service infrequently, e.g., once a day or even less frequently, the times of the previous queries submitted by the user may not be relevant to the current query.

SUMMARY

In general, one innovative aspect of the subject matter described in this specification can be embodied in methods that include the actions of accessing query log data storing queries and user identifiers, wherein the query log data specify, for each user identifier: queries associated with the user identifier, each query associated with the user identifier being a query received from one or more user devices associated with the user identifier, and for each query, a submission time of the query, the submission time related to a time that the query was received by a search system; training, by a data processing apparatus, a prediction model to generate a category prediction of a next query from a set of queries, the category prediction specifying categories to which a next query is predicted to belong, wherein the prediction model comprises a plurality of prediction functions that each generate a category prediction of a next query based on the query log data and category data defining categories to which the queries belong, wherein the prediction functions include: one or more time-based prediction functions that generate a category prediction based on the category data and a difference of submission times of the queries, one or more rank-based prediction functions that generate a category prediction based on the category data and a rank order by which the queries were received, and one or more category-based prediction function that generates a category prediction based on the category data and that is independent of the submission times of the queries. Other embodiments of this aspect include corresponding systems, apparatus, and computer programs, configured to perform the actions of the methods, encoded on computer storage devices.

In general, another aspect of the subject matter described in this specification can be embodied in methods that include the actions of accessing query log data storing queries and user identifier, wherein the query log data specify, for each user identifier: queries associated with the user identifier, each query associated with the user identifier being a query received from one or more user devices associated with the user identifier, and for each query, a submission time of the query, the submission time related to a time that the query was received by a search system; training, by a data processing apparatus, a prediction model to generate a category prediction of a next query from a set of queries, the category prediction specifying categories to which a next query is predicted to belong, wherein the prediction model comprises two or more of a time-based prediction function that generates a category prediction of a next query based on the category data and a difference of submission times of the queries, and includes time-based prediction parameters, a rank-based prediction function that generates a category prediction based on a rank order by which the queries were received, and includes rank-based prediction parameter and a category-based prediction function that generates a category prediction based on the category data of the queries and that is independent of the submission times of the queries, and includes category-based prediction parameters; and the training comprises iteratively generating category predictions for the prediction model and adjusting the time-based prediction parameters, rank-based prediction parameters and category-based prediction parameters of the prediction functions for each iteration until a termination event occur. Other embodiments of this aspect include corresponding systems, apparatus, and computer programs, configured to perform the actions of the methods, encoded on computer storage devices.

Particular embodiments of the subject matter described in this specification can be implemented to realize one or more of the following advantages. The machined learned prediction model is trained over at least two of three prediction functions—a time-based prediction function, a rank-based prediction, and a category-based prediction function. Training over two or more functions accounts for the sensitivity of any one function, and thus facilitates the generation of predictions that are more reliable then predictions based on any one of the functions. The prediction model can be further partitioned along domains (e.g., a domain for a map-based service, a domain for a social network, a domain for processing informational queries, etc.) and/or device categories (e.g., a mobile device, a desktop device, etc.) which also accounts for the sensitivity of any one function for a particular domain or device category. The training process can use different types of prediction functions, allowing system administrators to train multiple different models for evaluation and select the best model(s) for deployment.

The details of one or more embodiments of the subject matter described in this specification are set forth in the accompanying drawings and the description below. Other features, aspects, and advantages of the subject matter will become apparent from the description, the drawings, and the claims.

BRIEF DESCRIPTION OF THE DRAWINGS

Like reference numbers and designations in the various drawings indicate like elements.

DETAILED DESCRIPTION 1.0 Overview

Users often submit multiple queries to a search engine—sometimes in rapid succession, sometimes over days. A system that implements the subject matter of this written description analyzes the queries for each user to predict what type of query the user will submit next, or more generally, to predict the categories in which the user is interested.

In particular, the system balances the relative weights of query frequency against query times. For example, for any given user, the prediction model may predict different topics for a next query, depending on whether the model determines that the user's current interests are indicated by the queries that the user submits more often or by the queries that the user submitted most recently.

The system uses at least two of the following three types of prediction functions—a time-based prediction function, a rank-based prediction, and a category-based prediction function. The time-based prediction function generates a category prediction based on category data describing categories to which a user's previous queries belong and a difference of submission times of the queries. The rank-based prediction function generates a category prediction based on a rank order by which the queries were received. The category-based prediction function generates a category prediction based on the category data of the queries. The category predictions of the category-based prediction function are determined independent of the submission times of the queries, i.e., the submission times of the queries are not considered when determining category predictions of the category-based prediction function.

The system trains a machine-learned model that combines at least two of the three prediction functions. Each prediction function includes respective prediction parameters, such as formula parameters and function weights. A machine learning process is used to select values for the respective prediction parameters and weights for the trained model. Once trained, the model is used to predict categories of interest for a particular user based on the query history of the user. The predicted categories can be used in a variety of applications—e.g., for targeting advertisements to the user, for suggesting web sites that may be of interest to the user, and any other operations that can satisfy a user's informational needs.

1.1 Example Environment

Figure 1:
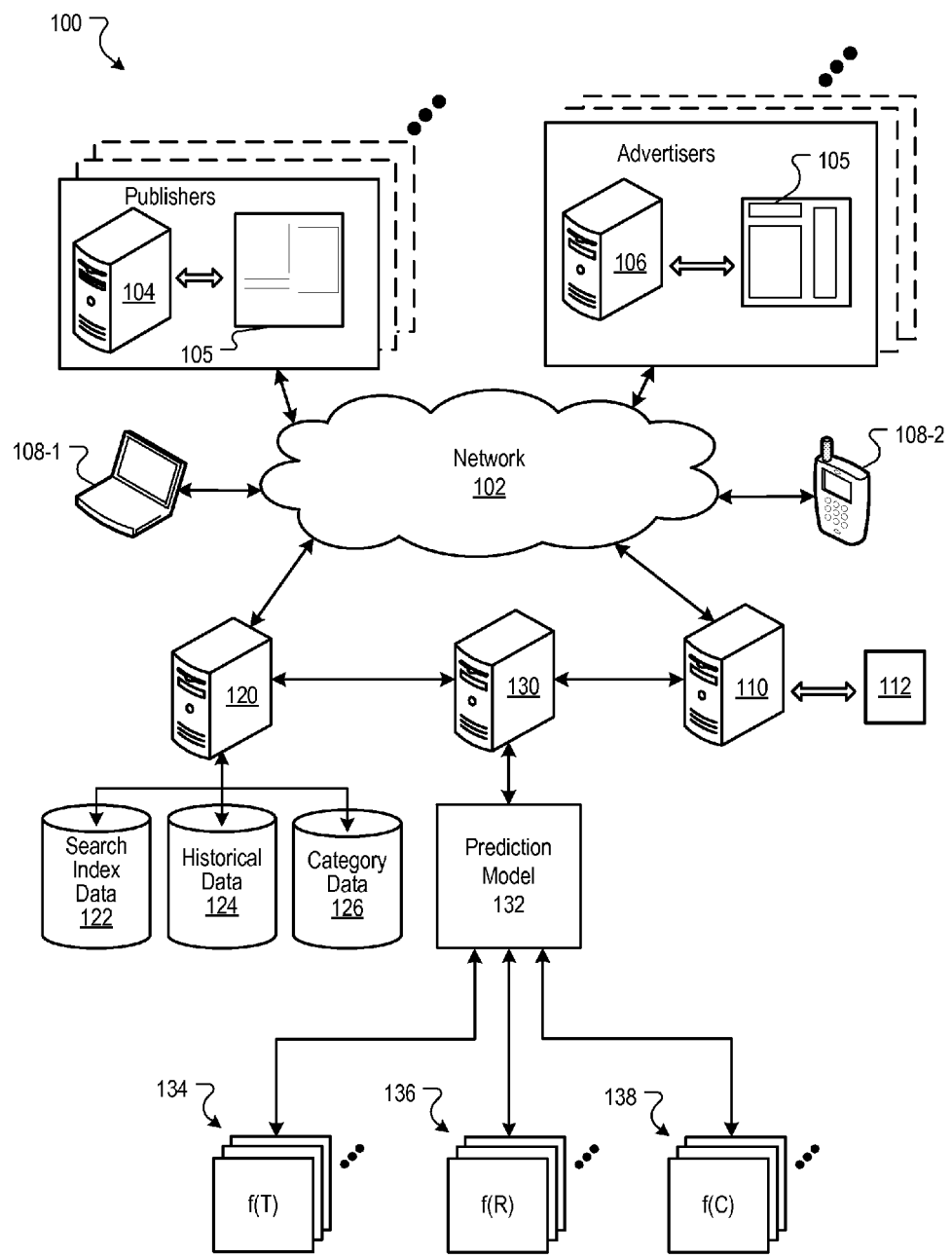
FIG. 1 is a block diagram of an example environment in which a category prediction model is used to predict user interests.

FIG. 1 is a block diagram of an example environment 100 in which a category prediction model 132 is used to predict user interests. A computer network 102, such as the Internet, or a combination of the Internet and one or more wired and wireless networks, connects syndication publishers 104, advertisers 106, user devices 108-1 and 108-2, an advertisement management system 110, a search engine 120, and a prediction system 130.

Only one representative entity is respectively shown for each of the user devices 108-1 and 108-2 to avoid congestion in the drawings. Each user device 108 is an electronic device that is under control of a user and is capable of requesting and receiving resources 105 over the network 102. Example user devices 108 include personal computers (e.g., user device 108-1), mobile communication devices (e.g., user device 108-2) and other devices that can send and receive data over the network 102. A user device 108 typically includes a user application, such as a web browser or other communication software, to facilitate the sending and receiving of data over the network 102.

The publishers 104 and, optionally, the advertisers 106 maintain websites. Each website is one or more resources 105 associated with a domain name, and each is hosted by one or more servers. A resource is any data that can be provided by the web site over the network 102 and that is associated with a resource address. Resources include HTML pages, RSS feeds, and video, for example. To avoid congestion in the drawings, the resources 105 are represented as web pages; however, the representations of FIG. 1 are inclusive of all types of resources that are consistent with the above definition.

Each of the publishers 104 are in data communication with the advertisement management system 110. The advertisement management system 110 facilitates the provisioning of advertisements 112 with the publisher resources 105, or with search results served by the search engine 120. In particular, the advertisement management system 110 allows advertisers to define targeting rules to provide targeted advertisements for the users.

An example publisher 104 is a general content web site, e.g., a sports related web site, a news related web site, a social network web site, etc. When a user device 108 receives a resource 105 from the publisher 104, the user device renders the webpage 105. The webpage 105 includes instructions that cause the user device to request advertisements from the advertisement management system 110. The advertisement management system 110, in turn, provides targeted advertisements to the particular user device. When a user selects an advertisement, the user device 108 generates a request for a landing page of the advertisement, which is typically a webpage 105 of the advertiser 106.

The search engine 120 is a search service that provides advertisements to users with search results that are responsive to user queries. To facilitate searching of resources 105, the search engine 120 crawls and indexes the resources 105. Indexing data are stored in a search index data store 122. Typically, the search results are provided in one part of the page, such as the left-hand side, and the advertisements 112 are provided in another part of the page, such as the right-hand side of the page. When the search engine 120 provides the search results webpage to the user device 108, the user device renders the webpage 105. The webpage 105 includes instructions that cause the user device to request advertisements from the advertisement management system 110. The advertisement management system 110, in turn, provides targeted advertisements to the particular user device.

The queries submitted during the user search sessions are stored in a historical data store 124. The historical data can include query logs, which store queries submitted by users, and the submission times of the queries, and click logs, which store data identifying the actions taken by the users using the user devices. The click logs and query logs can be used to map queries submitted during search sessions to resources that were identified in response to the queries and that were selected by the users of the user devices 108.

In some implementations, to protect the privacy of users, the search engine 120 anonymizes the historical data for each user so that the data stored in the historical data 124 cannot be associated with the user. In some implementations, if the user opts-in for tracking of the user history data, the search engine 120 can associate search queries and, optionally, selections of search results with a user identifier that is uniquely associated with the user.

The user can thus grant permission to the search engine 120 to track the user's history so that historical data for the user's search sessions and other user data are tracked and associated with the user identifier. At the user's option, the search engine 120 can be configured to track only data approved by the user, such as only search queries. The user can clear all historical data associated with the user's user identifier at any time, and can opt-out of such tracking at any time.

The search engine 120 also has access to a category data store 126, which stores category data defining categories to which the queries belong. A variety of categorization schemes can be used to generate the category data, such as a category taxonomy. In some implementations, the strength of each classification for a particular query is represented by a category weight for the query. For example, the query "Jane Roe's Burgers," where "Jane Roe's Burgers" is the name of a restaurant chain, may be classified as belonging to the category of "Restaurants" with a weight of 0.8 (out of a maximum of 1.0); "Fast Food" with a weight of 0.15; and "Hamburgers" with a weight of 0.10, etc.

In some implementations, the search engine 120 generates the category data; in other implementations, the category data is provided by a process that is separate from the search engine 120.

The prediction system 130 accesses the historical data store 124 and the category data store 126 to generate a prediction model 130. The prediction model 130 is used to predict categories for a next query given a set of recent queries for a user. For example, for the following two users, each associated with a respective user identifier, assume the following recent query history:

TABLE 1

| Query Submission Time | Query for User Identifier 1 |
|---|---|
| fridge | Today, 2:20:00 PM |
| sports car | 5 days ago, 3:10:00 PM |
| ferrari | 5 days ago, 3:04:30 PM |
| porsche | 5 days ago, 3:01:20 PM |
| lamborghini | 10 days ago, 7:15:02 PM |

TABLE 2

| Query Submission Time | Query for User Identifier 2 |
|---|---|
| fridge | 5 days ago, 3:20:00 PM |
| sports car | 5 days ago, 3:10:00 PM |
| ferrari | 5 days ago, 3:04:30 PM |
| porsche | 5 days ago, 3:01:20 PM |
| lamborghini | 5 days ago, 2:55:02 PM |

Using two or more of the time-based prediction functions 134, rank-based prediction functions 136, or category-based prediction functions 138 allows the prediction model 132 to take into account more than one prediction constraint when prediction future categories for a particular query history. For example, assume that the prediction model 132, based on the corpus of queries for multiple users, is trained to determine that time is more indicative of current interests as the time of a most recent query increases from a next most recent query. Conversely, the prediction model 132 is also trained to determine that category frequency is more indicative of current interests as the time of a most recent query decreases from a next most recent query. Accordingly, for the query history of Table 1, the prediction model 132 may predict that the categories of "consumer goods" and the sub-topic of "kitchen appliances" are the current user interest. However, for the query history of Table 2, the prediction model 132 may predict the categories of "automobiles" and "luxury sports cars" are the current user interests.

2.0 Prediction Model Training

Figure 2:
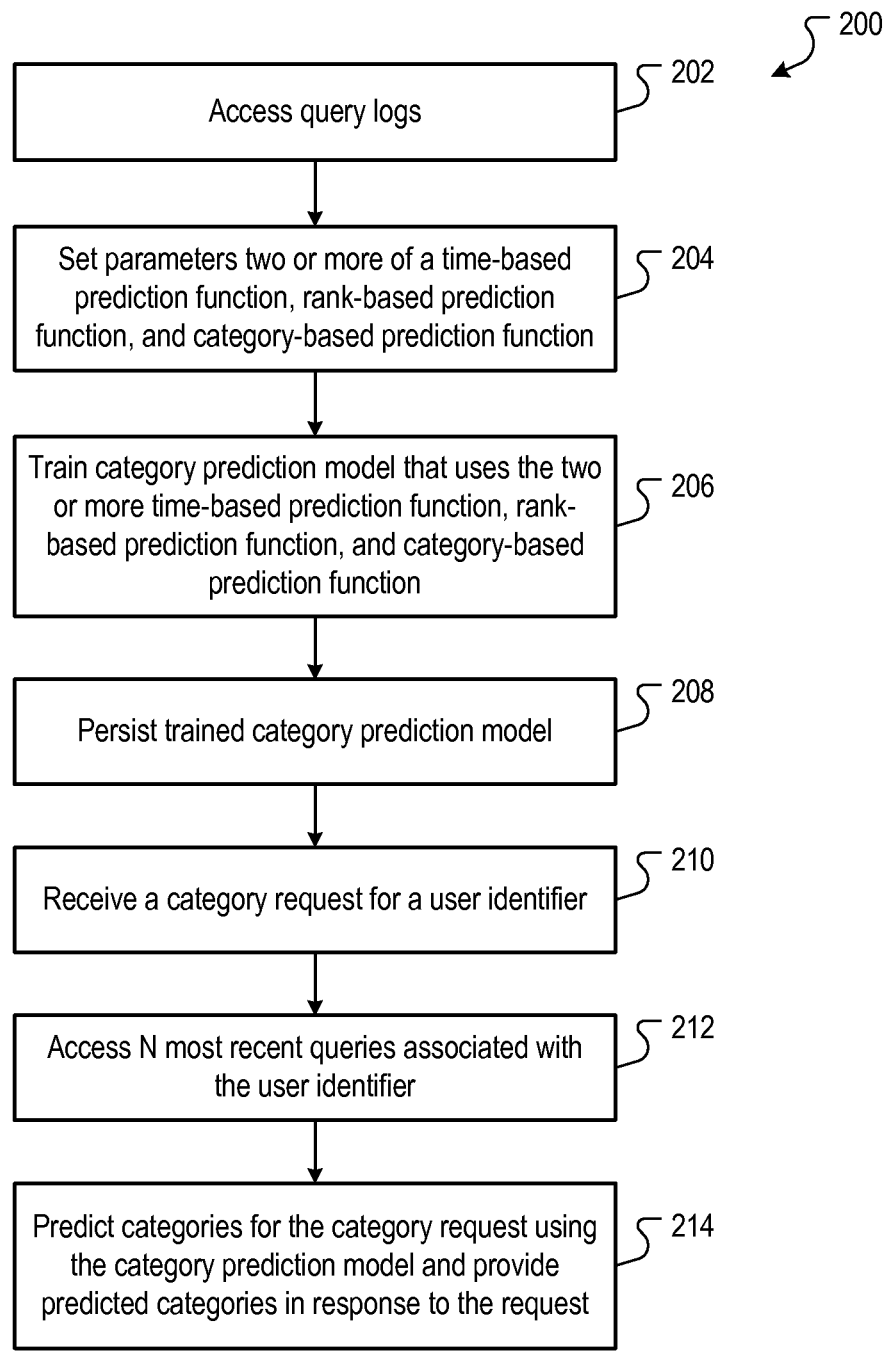
FIG. 2 is a flow diagram of an example process for training a category prediction model and using the prediction model to predict user interests.

FIG. 2 is a flow diagram of an example process 200 for training a category prediction model and using the prediction model to predict user interests. The process 200 can be used in the prediction system 130 of FIG. 1.

The process 200 accesses query logs (202). For example, the prediction system 130 accesses the historical data store 124, which stores queries and user identifiers. In some implementations, the query log data specify, for each user identifier, queries associated with the user identifier. In some implementations, each query associated with the user identifier is a query received from one or more user devices associated with the user identifier. For example, the same user may use both user devices 108-1 and 108-2, and may log into a user account maintained by the search engine 120. Accordingly, queries that the user submitted by use of the user devices 108-1 in 108-2 are associated with the user identifier for the user account. Alternatively, each user device may have its own user identifier (such as a quasi-unique search toolbar cookie identifier), and the queries that are respectively submitted from each user device 108-1 and 108-2 are associated with only the respective user identifiers.

The query log data also store, for each query, a submission time of the query. The submission time is related to a time that the query was received by the search system 120. For example, the submission time may be a timestamp that was attached by the user device when the user submitted the query, or may be a timestamp that is attached by the search system 120 when the search system 120 receives the query. The timestamps can be a date, or a timestamp relative to a reference epoch time.

The process 200 sets parameters for two or more of a time-based prediction function, rank-based prediction function, and a category-based prediction function (204). For example, the prediction engine 130 can set time-based prediction parameters for a time-based prediction function 134, rank-based prediction parameters for a rank-based prediction function 136, and category-based prediction parameters for a category-based prediction function 138.

There are varieties of prediction functions of each type that can be used, and three examples are described below. The follow three examples are illustrative only; different functions can be used, and multiple functions of the same type can be used. For example, the prediction model 132 can be trained on two time-based functions 134, one rank-based function 136, and three category-based functions 138, as indicated by the ellipses in FIG. 1.

An example time-based prediction function generates a category prediction by decreasing a category weight for each category of the query in proportion to the amount of time that has passed since the submission time of the query. For example, for each query, the categories to which it is determined to belong and the associated weights are obtained. The weights are then scaled by a time-based weight that is calculated according to equation (1)

$$W_{qt} = \frac{1}{\text{floor}\left(\frac{T_t - T_q}{\text{Increment}}\right)^\alpha} \quad (1)$$

The prediction parameters are:
$W_{qt}$ is the time-based weight for query q;
$T_t$ is the training time selected for training (e.g., a current time);
$T_q$ is the submission time of the query q;
$\alpha$ is a damping factor; and
Increment is the minimum time increment.

Queries with query times that resolve to the same increment have the same weight. For example, if the increment is days, then queries with submission times for the same day have the same value of $W_{qt}$. Conversely, if the increment is minutes, then only queries with a submission time of the same minute have the same weight.

The time-based weight can cause the categories to be weighted in proportion to the amount of time that has passed since the submission time of the query. These weighted proportions are then used to predict query categories. For example, with respect to Table 1 above, the category predictions for the queries may result in the categories of "consumer goods" and the sub-category of "kitchen appliances" being assigned the highest category weights. However, with respect to Table 2, the category predictions for the queries may result in the categories of "automobiles" and "luxury sports cars" being assigned the highest weights.

An example rank-based prediction function generates a weight based on the rank-order in which the queries are received. The rank-based weight is used to proportionally scale the category weights of the query. For example, in Tables 1 and 2, each of the five queries are received in the same rank order, and thus the rank-based weights for each category of the queries that are in the same rank would be the same. For each query, the categories to which it is determined to belong and the associated weights are obtained. The weights are then scaled by a rank-based weight that is calculated according to equation (2):

$$W_{qr} = \frac{1}{K^{r_q - 1}} \quad (2)$$

The prediction parameters are:
$W_{qr}$ is the rank-based weight for query q;
$r_q$ is the rank order of the query q; and
K is a value greater than 1.0.

For example, in Tables 1 and 2, the respective ranks of the queries fridge, sports car, ferrari, porsche, and lamborghini are 1, 2, 3, 4 and 5. Assuming the value of K is 2, the respective weights are 1, ½, ¼, ⅛ and 1/16. Accordingly, the category predictions are based on the weights of each category for each query respectively multiplied by the rank-based weights.

An example frequency-based prediction function generates a category prediction based on categories frequencies of queries associated with a user identifier. For example, the following pseudo-code illustrates an example frequency-based function:

For last N queries:
{
For each query, receive category weights for query
For each query, sort categories by their category weights
For each query:
{
Select top M sorted categories for query; and
Increment counter for each category in top M sorted categories
}
}

Here the parameter M is selected, e.g., M=1, 2 or 3. However, other prediction parameters can also be used. For example, instead of a counter function, other functions can be used generate a category ranking weight. The functions can be selected to asymptotically approach a maximum limit and/or asymptotically decay to a minimum limit.

The category for the last N queries with the highest count is selected as the category for the next query. For example, in Tables 1 and 2, the top weighted category may be "automobiles."

Other prediction functions can also be used, and more than one prediction function of each type can also be used by the prediction model 132.

The process 200 trains a category prediction model that uses the two or more of a time-based prediction function, a rank-based prediction function, and a category-based prediction function (206). The prediction system 130 trains a model by use of a machine learning technique that combines the outputs of each of the constituent prediction functions. For example, if one each of a time-based prediction function, rank-based prediction function, and category based prediction function are used, then the output of the trained model is based on equation (3):

$$\{C\} = f(S_T * f(T), S_R * f(R), S_C * f(C)) \quad (3)$$

where
{C} are the predicted categories (and, optionally, corresponding scores for each category, wherein each score is above a minimum threshold) for a next query given a query history of N queries; and $S_T$, $S_R$, and $S_C$ are combination weights used as additional prediction parameters to weight the outputs of the respective time-based, rank-based and category-based prediction functions.

In implementations in which two more prediction functions of a particular type are used, a respective combination weight can be calculated for each prediction function. For example, if two time-based prediction functions are used, e.g., $f_1(T)$ and $f_2(T)$, then two combination weights $S_{T1}$ and $S_{T2}$ are determined. Alternatively, only one combination weight can be used for each type of prediction function.

A variety of training processes can be used to set the predication parameters. For example, any one of a stochastic hill-climbing algorithm, a simulated annealing algorithm, a genetic algorithm, a population-based incremental learning algorithm, or a TABU search algorithm can be used for training In some implementations, the training is iterative and one or more prediction parameter is adjusted for each training iteration. The training process continues until a termination event occurs, e.g., until an iteration limit is reached or a minimum error threshold is reached.

The process 200 persists the trained category prediction model (208). For example, the prediction system 130 stores the trained model to a data store.

The process 200 receives a category request for user identifier (210). For example, the search system 120, or the advertising system 110, may request a prediction of categories of interest for a user identifier. The request may be in response to receiving a search query associated with the user identifier, or in response to a user device associated with the user identifier navigating to a web page in which the categorization is ambiguous (e.g., a mapping service web page, a general blog with varied discussions, etc.).

The process 200 accesses the N most recent queries associated with the user identifier (212). For example, the prediction system 130 accesses up to 20 of the most recent queries associated with the user identifier and provides the queries and submission times to the prediction model 132.

The process 200 predicts categories for the category request using the category prediction model, and provides the predicted categories in response to the request (214). For example, the prediction model 132 is applied to the queries to predict the categories for the category request, and the prediction system 130 provides the predicted categories to the system that requested them.

2.1 Example Training Process

Figure 3:
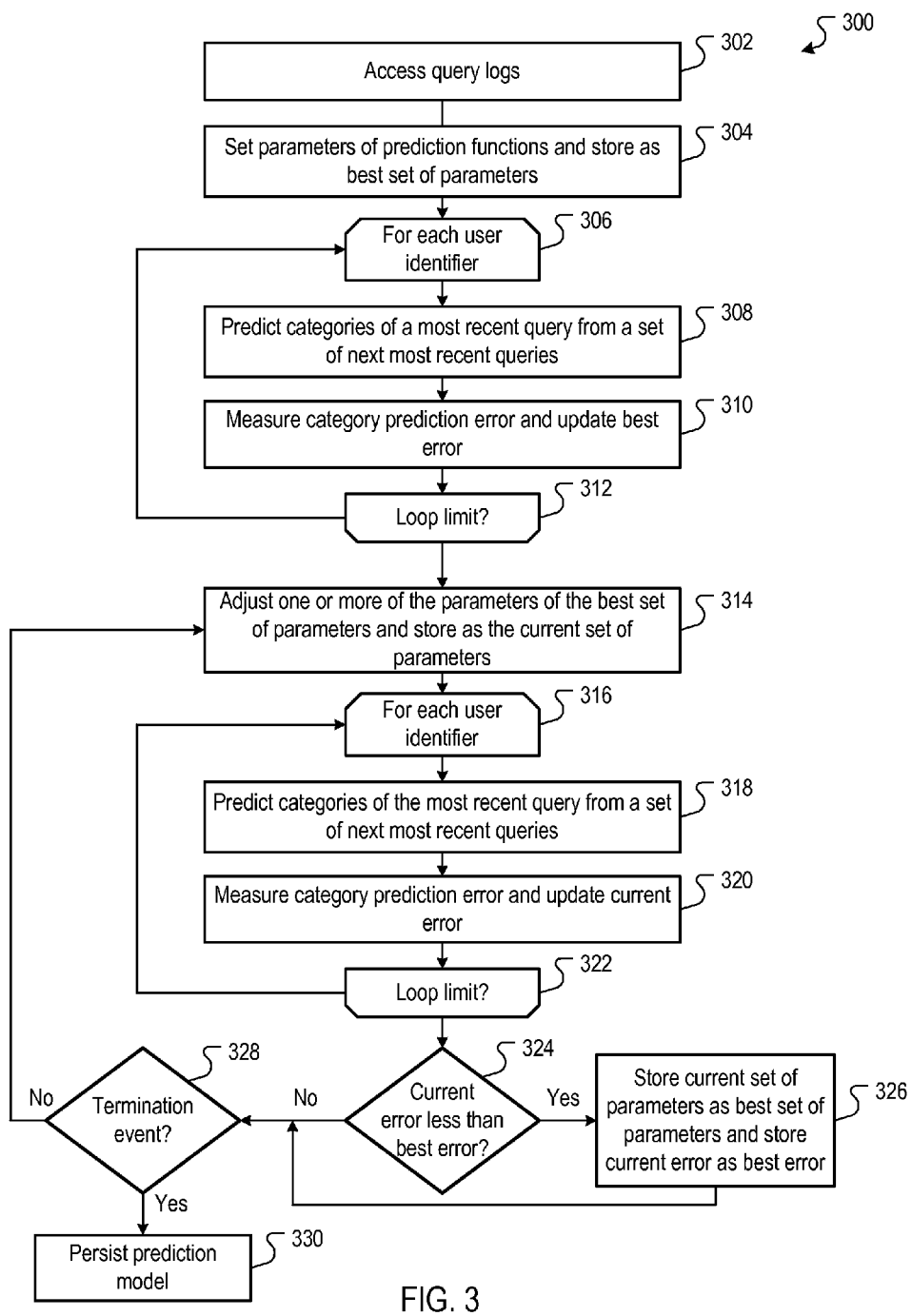
FIG. 3 is a flow diagram of an example process of iteratively training a category prediction model.

FIG. 3 is a flow diagram of an example process 300 of iteratively training a category prediction model. The process 300 can be used in the prediction system 130 of FIG. 1.

The process 300 accesses query logs (302). For example, the prediction system 130 accesses the historical data 124, which stores queries and user identifiers, as described above.

The process 300 sets parameters of prediction functions and stores the parameters as the best set of parameters (304). For example, the prediction system 130 may set the parameters of the prediction functions according to an initial set of values defined by the system administrator. Alternatively, the prediction system 130 may set the parameters to random values. The random values may be limited to predefined ranges, e.g., a value of 0 to 1 for a combination weight, a value between 1 and 3 for the weight K, etc. Because the initialization is the first step of the training process, the parameters of the prediction functions are stored as a best set of parameters. The best set of parameters is used as a reference set for further adjustments, which are discussed in more detail below.

The process 300, for each user identifier (306), predicts categories of the most recent query from a set of next most recent queries (308). In some implementations, the process 300 selects a respective set of most recent queries for each user identifier. The set of most recent queries are queries associated with the user identifier and that have most recent submission times of the queries associated with the user identifier. For example, up to 20 most recent queries can be selected for user identifier. The process 300 also receives, for each query in the set of most recent queries, the category data defining categories to which the query is determined to belong. Using the most recent queries, the category data, and submission times of the queries, the process 300 uses the prediction functions to generate the category predictions. In some implementations, the process 300 generates the category predictions from a proper subset of the set of most recent queries that excludes the query with the most recent submission time. For example, if 20 queries are selected, then the most recent query is excluded from the input data for the prediction functions. The most recent query is used to determine an error measurement.

The process 300, for each user identifier, measures the category prediction error and updates and stores a best error measurement (310). For example, for each category prediction for each user identifier, the process 300 compares the category prediction of the prediction model to the categories to which the query with the most recent submission time is determined to belong. As the most recent query is an example of actual user input, the actual user input can be used to test the accuracy of the query predictions from the previous queries of user. The error measurement is updated after each iteration until all of the user identifiers are processed. The update can be based on an average error, a root mean square error, a median error, or some other value.

After queries for all user identifiers have been processed (312), process 300 adjusts the parameters of the best set of parameters and stores the adjusted parameters as the current set of parameters (314). For example, the process can randomly adjust only one of the prediction parameters and store the adjusted set of parameters as a current set of parameters. In other implementations, more than one prediction parameter can be adjusted during an iteration.

After execution of step 314 following the initialization, two sets of parameters now stored—the best set and the current set. As will be described in more detail below, the best set of parameters is iteratively updated when a current set of parameters exhibits better performance in the model.

The process 300, for each user identifier (316), predicts categories of the most recent query from a set of next most recent queries (318). The process step 318 is similar to the process step 308, except that the current set of parameters are used to generate the category predictions.

The process 300, for each user identifier, measures the category prediction error and updates and stores a current error measurement (320). The process step 320 is similar to the process step 310 described above.

After queries for all user identifiers have been processed (322), two error measurements are stored—the current error for the current set of parameters, and the best error for the best of parameters. These two error measurements are used to determine which set of parameters to retain for the next iteration.

The process 300 determines whether the current error is less than the best error (324). If the current error is less than the best error, then the process 300 stores the current set of parameters as the best set of parameters, and stores the current error as the best error (326). Accordingly, the best set of parameters is now updated for use in additional training iterations, as is the best error.

If the current error is not less than the best error (or after the process has stored the current set of parameters as the best set of parameters in step 326), the process 300 determines if a termination event has occurred (328). Example termination events include achieving an iteration limit, or achieving a minimum error threshold limit. Other termination events can also be used.

If a termination event has not occurred, the process 300 adjusts the parameters of the best set of parameters and stores the adjusted parameters as the current set of parameters (314), and continues with the next iteration. In this way, each time a current set of parameters outperforms a previously stored best set of parameters, the current set of parameters are stored as the best of parameters. Thus, at the end of the training process, the set of parameters that resulted in the lowest error measurement during the training process is used for the prediction model 132.

If a termination event occurs, the process 300 persists the prediction model to a data store (330). In some implementations, the prediction model is persisted only if the best error is below a minimum error threshold limit. Otherwise, a failure signal is generated (e.g., failure to achieve a minimum error threshold limit before an iteration limit was reached).

3.0 Domain and Device Types for Model Generation

In some implementations, multiple prediction models can be generated, and each model corresponds to a domain category or a user device type. A domain category specifies a category to which the domain belongs. The category can be associated with the content or service provided by a website assisted with the domain. Example domain categories include a maps category, a social network category, or a general content category. Other domain categories can also be used.

The query log data can specify, for each query, domain categories for which a query was submitted from a user device. For example, a query submitted by a user searching for a restaurant on a maps resource page that belongs to a maps domain category can be associated with the maps domain category. The associating of queries with domain categories can facilitate additional refinements to the prediction model 132. In particular, users may exhibit different interest behaviors for different domain categories. For example, the interests of users that are submitting queries on resource pages that belong to a maps domain category may be highly sensitive with respect to time, as users are typically searching for a physical destination to visit in the near future. Likewise, the interests of users that are submitting queries in a social network domain may be more sensitive to frequency, as users with similar interests tend to discuss the same topics frequently.

Accordingly, the prediction models 132 are trained on respective sets of the most recent queries for each user identifier and each domain category. For example, a particular user identifier may have associated queries that were submitted for a maps domain category and a social network domain category. Two prediction models may be trained using this data. The first prediction model may be trained only on queries that are associated with the maps domain category, and the second prediction model may be trained only on data associated with the social network domain category. The prediction models are trained and persisted, and are then used to respond to category requests on a per-domain category basis. For example, the advertisement management system can make the category request for a particular user identifier, and the category request may specify that the category request is for a social network domain. Accordingly, the prediction model that has been generated for the social network domain will be used to predict categories for the user identifier.

A similar training process can be based on device categories. A device category is a category of a user device from which a query was submitted. Example device categories include a mobile device category and a desktop device category. As with domain categories, predicting user interests can be tuned based on the types of device the users are currently using. Accordingly, a prediction model 132 for each device category is trained on respective sets of most recent query for each user identifier and each device category.

4.0 Additional Implementation Details

Embodiments of the subject matter and the operations described in this specification can be implemented in digital electronic circuitry, or in computer software, firmware, or hardware, including the structures disclosed in this specification and their structural equivalents, or in combinations of one or more of them. Embodiments of the subject matter described in this specification can be implemented as one or more computer programs, i.e., one or more modules of computer program instructions, encoded on computer storage medium for execution by, or to control the operation of, data processing apparatus. Alternatively or in addition, the program instructions can be encoded on an artificially-generated propagated signal, e.g., a machine-generated electrical, optical, or electromagnetic signal, that is generated to encode information for transmission to suitable receiver apparatus for execution by a data processing apparatus. A computer storage medium can be, or be included in, a computer-readable storage device, a computer-readable storage substrate, a random or serial access memory array or device, or a combination of one or more of them. Moreover, while a computer storage medium is not a propagated signal, a computer storage medium can be a source or destination of computer program instructions encoded in an artificially-generated propagated signal. The computer storage medium can also be, or be included in, one or more separate physical components or media (e.g., multiple CDs, disks, or other storage devices).

The operations described in this specification can be implemented as operations performed by a data processing apparatus on data stored on one or more computer-readable storage devices or received from other sources.

The term "data processing apparatus" encompasses all kinds of apparatus, devices, and machines for processing data, including by way of example a programmable processor, a computer, a system on a chip, or multiple ones, or combinations, of the foregoing. The apparatus can include special purpose logic circuitry, e.g., an FPGA (field programmable gate array) or an ASIC (application-specific integrated circuit). The apparatus can also include, in addition to hardware, code that creates an execution environment for the computer program in question, e.g., code that constitutes processor firmware, a protocol stack, a database management system, an operating system, a cross-platform runtime environment, a virtual machine, or a combination of one or more of them. The apparatus and execution environment can realize various different computing model infrastructures, such as web services, distributed computing and grid computing infrastructures.

A computer program (also known as a program, software, software application, script, or code) can be written in any form of programming language, including compiled or interpreted languages, declarative or procedural languages, and it can be deployed in any form, including as a stand-alone program or as a module, component, subroutine, object, or other unit suitable for use in a computing environment. A computer program may, but need not, correspond to a file in a file system. A program can be stored in a portion of a file that holds other programs or data (e.g., one or more scripts stored in a markup language document), in a single file dedicated to the program in question, or in multiple coordinated files (e.g., files that store one or more modules, sub-programs, or portions of code). A computer program can be deployed to be executed on one computer or on multiple computers that are located at one site or distributed across multiple sites and interconnected by a communication network.

The processes and logic flows described in this specification can be performed by one or more programmable processors executing one or more computer programs to perform actions by operating on input data and generating output. The processes and logic flows can also be performed by, and apparatus can also be implemented as, special purpose logic circuitry, e.g., an FPGA (field programmable gate array) or an ASIC (application-specific integrated circuit).

Processors suitable for the execution of a computer program include, by way of example, both general and special purpose microprocessors, and any one or more processors of any kind of digital computer. Generally, a processor will receive instructions and data from a read-only memory or a random access memory or both. The essential elements of a computer are a processor for performing actions in accordance with instructions and one or more memory devices for storing instructions and data. Generally, a computer will also include, or be operatively coupled to receive data from or transfer data to, or both, one or more mass storage devices for storing data, e.g., magnetic, magneto-optical disks, or optical disks. However, a computer need not have such devices. Moreover, a computer can be embedded in another device, e.g., a mobile telephone, a personal digital assistant (PDA), a mobile audio or video player, a game console, a Global Positioning System (GPS) receiver, or a portable storage device (e.g., a universal serial bus (USB) flash drive), to name just a few. Devices suitable for storing computer program instructions and data include all forms of non-volatile memory, media and memory devices, including by way of example semiconductor memory devices, e.g., EPROM, EEPROM, and flash memory devices; magnetic disks, e.g., internal hard disks or removable disks; magneto-optical disks; and CD-ROM and DVD-ROM disks. The processor and the memory can be supplemented by, or incorporated in, special purpose logic circuitry.

To provide for interaction with a user, embodiments of the subject matter described in this specification can be implemented on a computer having a display device, e.g., a CRT (cathode ray tube) or LCD (liquid crystal display) monitor, for displaying information to the user and a keyboard and a pointing device, e.g., a mouse or a trackball, by which the user can provide input to the computer. Other kinds of devices can be used to provide for interaction with a user as well; for example, feedback provided to the user can be any form of sensory feedback, e.g., visual feedback, auditory feedback, or tactile feedback; and input from the user can be received in any form, including acoustic, speech, or tactile input. In addition, a computer can interact with a user by sending documents to and receiving documents from a device that is used by the user; for example, by sending web pages to a web browser on a user's client device in response to requests received from the web browser.

Embodiments of the subject matter described in this specification can be implemented in a computing system that includes a back-end component, e.g., as a data server, or that includes a middleware component, e.g., an application server, or that includes a front-end component, e.g., a client computer having a graphical user interface or a Web browser through which a user can interact with an implementation of the subject matter described in this specification, or any combination of one or more such back-end, middleware, or front-end components. The components of the system can be interconnected by any form or medium of digital data communication, e.g., a communication network. Examples of communication networks include a local area network ("LAN") and a wide area network ("WAN"), an inter-network (e.g., the Internet), and peer-to-peer networks (e.g., ad hoc peer-to-peer networks).

The computing system can include clients and servers. A client and server are generally remote from each other and typically interact through a communication network. The relationship of client and server arises by virtue of computer programs running on the respective computers and having a client-server relationship to each other. In some embodiments, a server transmits data (e.g., an HTML page) to a client device (e.g., for purposes of displaying data to and receiving user input from a user interacting with the client device). Data generated at the client device (e.g., a result of the user interaction) can be received from the client device at the server.

While this specification contains many specific implementation details, these should not be construed as limitations on the scope of any inventions or of what may be claimed, but rather as descriptions of features specific to particular embodiments of particular inventions. Certain features that are described in this specification in the context of separate embodiments can also be implemented in combination in a single embodiment. Conversely, various features that are described in the context of a single embodiment can also be implemented in multiple embodiments separately or in any suitable subcombination. Moreover, although features may be described above as acting in certain combinations and even initially claimed as such, one or more features from a claimed combination can in some cases be excised from the combination, and the claimed combination may be directed to a subcombination or variation of a subcombination.

Similarly, while operations are depicted in the drawings in a particular order, this should not be understood as requiring that such operations be performed in the particular order shown or in sequential order, or that all illustrated operations be performed, to achieve desirable results. In certain circumstances, multitasking and parallel processing may be advantageous. Moreover, the separation of various system components in the embodiments described above should not be understood as requiring such separation in all embodiments, and it should be understood that the described program components and systems can generally be integrated together in a single software product or packaged into multiple software products.

Thus, particular embodiments of the subject matter have been described. Other embodiments are within the scope of the following claims. In some cases, the actions recited in the claims can be performed in a different order and still achieve desirable results. In addition, the processes depicted in the accompanying figures do not necessarily require the particular order shown, or sequential order, to achieve desirable results. In certain implementations, multitasking and parallel processing may be advantageous.

What is claimed is:

1. A method performed by data processing apparatus, the method comprising:

accessing query log data storing queries and user identifiers, wherein the query log data specify, for each user identifier:

queries associated with the user identifier, each query associated with the user identifier being a query received from one or more user devices associated with the user identifier; and for each query, a submission time of the query, the submission time related to a time that the query was received by a search system;

training, by a data processing apparatus, a prediction model to generate a category prediction of a next query from a set of queries, the category prediction specifying categories to which the next query is predicted to belong, wherein the prediction model comprises a plurality of prediction functions that each generate a category prediction of the next query, wherein each category prediction is based on the query log data and category data defining, for each query of the set of queries, categories to which the query belongs, and wherein the prediction functions include a combination of:

one or more time-based prediction functions that generate a category prediction of the next query based on the category data and a difference of submission times of the queries of the set of queries, the one or more time-based prediction functions generating a category prediction of the next query by:

adjusting, for each particular query of the set of queries, a category weight for each category to which the particular query belongs based on an amount of time that has passed since the submission time of the particular query; and generating a category prediction of the next query based on the adjusted category weights for each category and for each particular query;

one or more rank-based prediction functions that generate a category prediction of the next query based on the category data and a rank order by which the queries of the set of queries were received; and one or more category-based prediction functions that generate a category prediction of the next query based on the category data and that is independent of the submission times of the queries of the set of queries.

2. The method of claim 1, wherein:
each of the one or more time-based prediction functions include time-based prediction parameters;
each of the one or more rank-based prediction functions include rank-based prediction parameters;
each of the one or more category-based prediction functions include category-based prediction parameters; and
training the prediction model comprises iteratively generating category predictions for the prediction model and adjusting the time-based prediction parameters, rank-based prediction parameters and category-based prediction parameters of the prediction functions for each iteration until a termination event occurs.

3. The method of claim 2, wherein training the prediction model comprises, for each iteration subsequent to a first iteration:
adjusting one or more of the prediction parameters of the prediction functions to generate a current set of parameters;
for each user identifier:
selecting a respective set of most recent queries, the set of most recent queries being the queries associated with the user identifier and that have most recent submission times of the queries associated with the user identifier;
receiving, for each query in the set of most recent queries, the category data defining categories to which the query is determined to belong;
generating a category prediction for the prediction model from a proper subset of the set of most recent queries that excludes the query with the most recent submission time;
comparing the category prediction for the prediction model to the categories to which the query with the most recent submission time is determined to belong;
determining, from the comparisons, a current error measure for the current set of parameters that measure an error of the category predictions generated for the prediction model;
comparing the error measure of the current set of parameters to a best error measure of a best set of parameters, the best error measure of the best set of parameters having been generated from a previous iteration and stored; and
storing the current set of parameters and the current error measure as the best set of parameters and the best error measure only if the current error measure is less that the best error measure.

4. The method of claim 3, wherein adjusting one or more of the prediction parameters of the prediction functions to generate a current set of parameters comprises adjusting one or more of the parameters stored as the best set of parameters.

5. The method of claim 4, wherein:
the prediction parameters of the prediction functions include a weight parameter that weights the category prediction of a next query.

6. The method of claim 5, wherein adjusting one or more of the prediction parameters of the prediction functions:
randomly selecting only one of the prediction parameters; and
randomly adjusting the selected prediction parameter.

7. The method of claim 3, wherein the termination event is achieving a maximum number of iterations.

8. The method of claim 3, wherein the termination event is determining an error measure that meets a minimum error threshold.

9. The method of claim 3, wherein:
the query log data specify, for each query, one of a plurality of a domain categories, each domain category being a category of a domain for which a query was submitted from a user device;
selecting a respective set of most recent queries for each user identifier comprises selecting a respective set of most recent queries for each user identifier and each domain category; and
training the prediction model comprises training a plurality of prediction models, wherein each prediction model is associated with a domain category is trained on only the sets of most recent queries for the domain category.

10. The method of claim 9, wherein the domain categories include a maps category, a social network category, or a general content category.

11. The method of claim 3, wherein:
the query log data specify, for each query, one of a plurality of a device categories, each device category being a category of a user device from which a query was submitted, and wherein the device categories include a mobile device category and a desktop device category;
selecting a respective set of most recent queries for each user identifier comprises selecting a respective set of most recent queries for each user identifier and each device category; and
training the prediction model comprises training a plurality of prediction models, wherein each prediction model is associated with a device category is trained on only the sets of most recent queries for the device category.

12. The method of claim 2, wherein training the prediction model comprises training the prediction model using one of a stochastic hill-climbing algorithm, a simulated annealing algorithm, a genetic algorithm, a population-based incremental learning algorithm, or a TABU search algorithm.

13. A method performed by data processing apparatus, the method comprising:
accessing query log data storing queries and user identifiers, wherein the query log data specify, for each user identifier:
queries associated with the user identifier, each query associated with the user identifier being a query received from one or more user devices associated with the user identifier; and
for each query, a submission time of the query, the submission time related to a time that the query was received by a search system;
training, by a data processing apparatus, a prediction model to generate a category prediction of a next query from a set of queries, the category prediction specifying categories to which a next query is predicted to belong, wherein:
the prediction model comprises a combination of two or more of:
a time-based prediction function that generates a category prediction of a next query based on category data and a difference of submission times of the queries of the set of queries, the category data defining, for each query of the set of queries, categories to which the queries query belongs, the time-based prediction function including time-based prediction parameters, the time-based prediction function generating a category prediction of the next query by:

adjusting, for each particular query of the set of queries, a category weight for each category to which the particular query belongs based on an amount of time that has passed since the submission time of the particular query; and generating a category prediction for the next query based on the adjusted category weight for each category and for each particular query;

a rank-based prediction function that generates a category prediction of the next query based on a rank order by which the queries of the set of queries were received, and includes rank-based prediction parameters; and a category-based prediction function that generates a category prediction of the next query based on the category data of the queries of the set of queries and that is independent of the submission times of the queries of the set of queries, and includes category-based prediction parameters; and the training comprises iteratively generating category predictions for the prediction model and respectively adjusting two or more of the time-based prediction parameters, rank-based prediction parameters and category-based prediction parameters of the prediction functions for each iteration until a termination event occurs.

14. The method of claim 13, wherein training the prediction model comprises, for each iteration subsequent to a first iteration:

adjusting one or more of the prediction parameters of the prediction functions to generate a current set of parameters;

for each user identifier:

selecting a respective set of most recent queries, the set of most recent queries being the queries associated with the user identifier and that have most recent submission times of the queries associated with the user identifier;

receiving, for each query in the set of most recent queries, the category data defining categories to which the query is determined to belong;

generating a category prediction for the prediction model from a proper subset of the set of most recent queries that excludes the query with the most recent submission time;

comparing the category prediction for the prediction model to the categories to which the query with the most recent submission time is determined to belong;

determining, from the comparisons, a current error measure for the current set of parameters that measure an error of the category predictions generated for the prediction model;

comparing the error measure of the current set of parameters to a best error measure of a best set of parameters, the best error measure of the best set of parameters having been generated from a previous iteration and stored; and storing the current set of parameters and the current error measure as the best set of parameters and the best error measure only if the current error measure is less that the best error measure.

15. Software comprising instructions stored in a non-transitory computer readable storage device that upon execution cause a data processing apparatus to perform operations comprising:

accessing query log data storing queries and user identifiers, wherein the query log data specify, for each user identifier:

queries associated with the user identifier, each query associated with the user identifier being a query received from one or more user devices associated with the user identifier; and for each query, a submission time of the query, the submission time related to a time that the query was received by a search system;

training, by a data processing apparatus, a prediction model to generate a category prediction of a next query from a set of queries, the category prediction specifying categories to which the next query is predicted to belong, wherein the prediction model comprises a plurality of prediction functions that each generate a category prediction of the next query based on the query log data and category data defining, for each query of the set of the set of queries, categories to which the queries query belong, wherein the prediction functions include a combination of:

one or more time-based prediction functions that generate a category prediction of the next query based on the category data and a difference of submission times of the queries, the one or more time-based prediction functions generating a category prediction of the next query by:

adjusting, for each particular query of the set of queries, a category weight for each category to which the particular query belongs based on an amount of time that has passed since the submission time of the particular query; and generating a category prediction of the next query based on the adjusted category weights for each category and for each particular query;

one or more rank-based prediction functions that generate a category prediction of the next query based on the category data and a rank order by which the queries of the set of queries were received; and one or more category-based prediction functions that generate a category prediction of the next query based on the category data and that is independent of the submission times of the queries of the set of queries.

16. Software comprising instructions stored in a non-transitory computer readable storage device that upon execution cause a data processing apparatus to perform operations comprising:

accessing query log data storing queries and user identifier, wherein the query log data specify, for each user identifier:

queries associated with the user identifier, each query associated with the user identifier being a query received from one or more user devices associated with the user identifier; and for each query, a submission time of the query, the submission time related to a time that the query was received by a search system;

training, by a data processing apparatus, a prediction model to generate a category prediction of a next query from a set of queries, the category prediction specifying categories to which a next query is predicted to belong, wherein:

the prediction model comprises a combination of two or more of:
  a time-based prediction function that generates a category prediction of a next query based on category data and a difference of submission times of the queries, the category data defining, for each query of the set of queries, categories to which the queries query belongs, the time-based prediction function including time-based prediction parameters, the time-based prediction function generating a category prediction of the next query by:
    adjusting, for each particular query of the set of queries, a category weight for each category to which the particular query belongs based on an amount of time that has passed since the submission time of the particular query; and
    generating a category prediction for the next query based on the adjusted category weight for each category and for each particular query;
  a rank-based prediction function that generates a category prediction of the next query based on a rank order by which the queries of the set of queries were received, and includes rank-based prediction parameters; and
  a category-based prediction function that generates a category prediction of the next query based on the category data of the queries of the set of queries and that is independent of the submission times of the queries of the set of queries, and includes category-based prediction parameters; and
the training comprises iteratively generating category predictions for the prediction model and adjusting the time-based prediction parameters, rank-based prediction parameters and category-based prediction parameters of the prediction functions for each iteration until a termination event occurs.

17. A system comprising:
a data processing apparatus; and
a memory device in data communication with the data processing apparatus and storing instructions that cause the data processing apparatus to perform operations comprising:
accessing query log data storing queries and user identifier, wherein the query log data specify, for each user identifier:
  queries associated with the user identifier, each query associated with the user identifier being a query received from one or more user devices associated with the user identifier; and
  for each query, a submission time of the query, the submission time related to a time that the query was received by a search system;
training, by a data processing apparatus, a prediction model to generate a category prediction of a next query from a set of queries, the category prediction specifying categories to which a next query is predicted to belong, wherein:
  the prediction model comprises a combination of two or more of:
    a time-based prediction function that generates a category prediction of a next query based on category data and a difference of submission times of the queries, the category data defining, for each query of the set of queries, categories to which the queries query belongs, the time-based prediction function including time-based prediction parameters, the time-based prediction function generating a category prediction of the next query by:
      adjusting, for each particular query of the set of queries, a category weight for each category to which the particular query belongs based on an amount of time that has passed since the submission time of the particular query; and
      generating a category prediction for the next query based on the adjusted category weight for each category and for each particular query;
    a rank-based prediction function that generates a category prediction of the next query based on a rank order by which the queries of the set of queries were received, and includes rank-based prediction parameters; and
    a category-based prediction function that generates a category prediction of the next query based on the category data of the queries of the set of queries and that is independent of the submission times of the queries of the set of queries, and includes category-based prediction parameters; and
  the training comprises iteratively generating category predictions for the prediction model and adjusting the time-based prediction parameters, rank-based prediction parameters and category-based prediction parameters of the prediction functions for each iteration until a termination event occurs.

18. The method of claim 1, wherein the one or more category-based prediction functions generates a category prediction of the next query based on a number of queries in the set of queries that belong to each of the categories to which the queries of the set of queries belong.

19. The method of claim 1, wherein the one or more category-based prediction functions generates a category prediction of the next query by:
  for each particular query of the set of queries, identifying a particular number of the one or more categories to which the particular query belongs;
  determining a number of queries in the set of queries that belong to each of the identified categories; and
  generating the category prediction of the next query based on the number of queries that belong to each of the identified categories.

20. The method of claim 1, wherein the rank order specifies a ranking of each query of the set of queries with respect to each other query of the set of queries.

21. The system of claim 17, wherein:
  each of the one or more time-based prediction functions include time-based prediction parameters;
  each of the one or more rank-based prediction functions include rank-based prediction parameters;
  each of the one or more category-based prediction functions include category-based prediction parameters; and
  training the prediction model comprises iteratively generating category predictions for the prediction model and adjusting the time-based prediction parameters, rank-based prediction parameters and category-based prediction parameters of the prediction functions for each iteration until a termination event occurs.

22. The system of claim 21, wherein training the prediction model comprises, for each iteration subsequent to a first iteration:
  adjusting one or more of the prediction parameters of the prediction functions to generate a current set of parameters;
  for each user identifier:

selecting a respective set of most recent queries, the set of most recent queries being the queries associated with the user identifier and that have most recent submission times of the queries associated with the user identifier;

receiving, for each query in the set of most recent queries, the category data defining categories to which the query is determined to belong;

generating a category prediction for the prediction model from a proper subset of the set of most recent queries that excludes the query with the most recent submission time;

comparing the category prediction for the prediction model to the categories to which the query with the most recent submission time is determined to belong;

determining, from the comparisons, a current error measure for the current set of parameters that measure an error of the category predictions generated for the prediction model;

comparing the error measure of the current set of parameters to a best error measure of a best set of parameters, the best error measure of the best set of parameters having been generated from a previous iteration and stored; and storing the current set of parameters and the current error measure as the best set of parameters and the best error measure only if the current error measure is less that the best error measure.

* * * * *